UNITED STATES PATENT OFFICE.

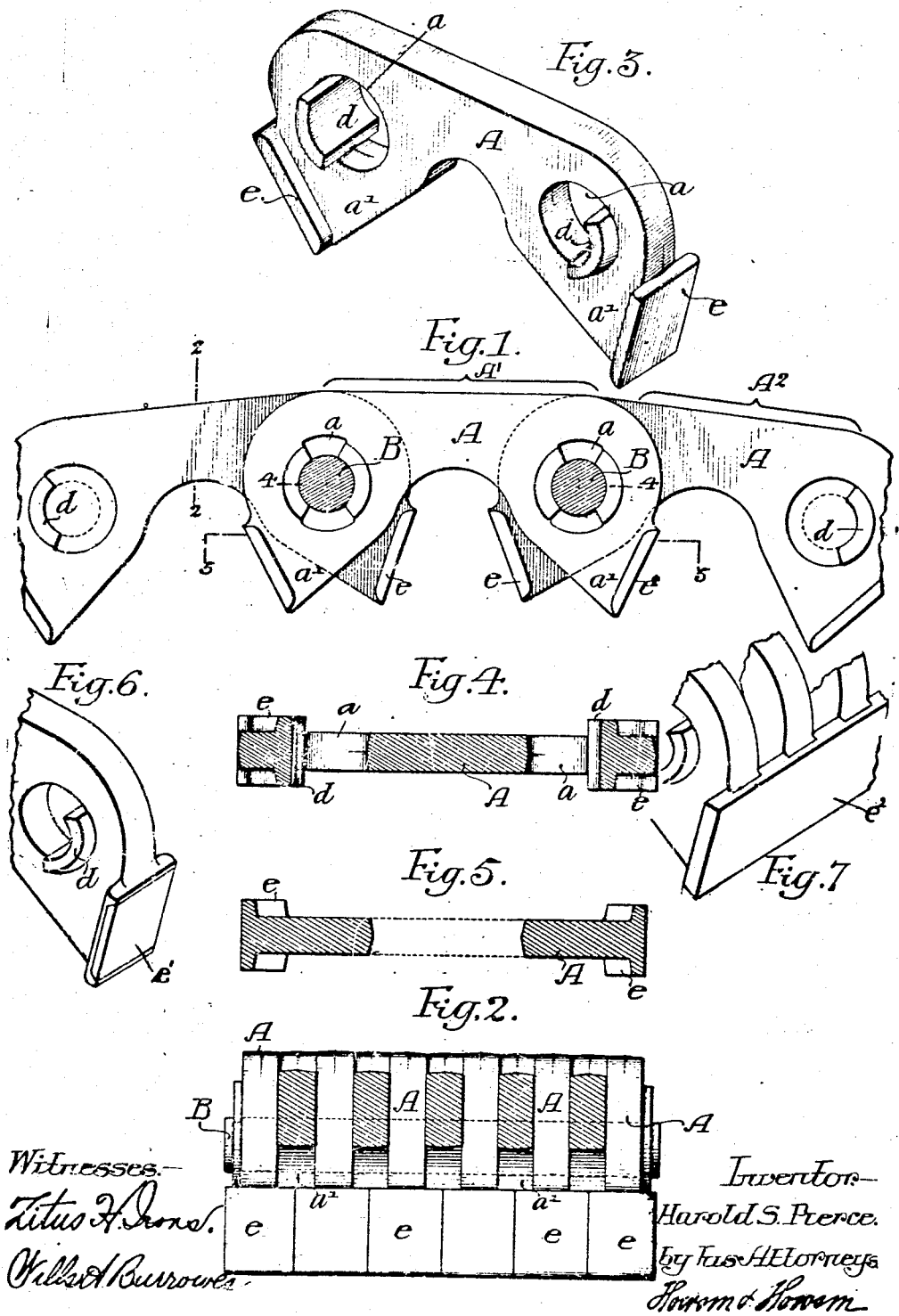

HAROLD S. PIERCE, OF PHILADELPHIA, PENNSYLVANIA, ASSIGNOR TO LINK-BELT COMPANY, OF CHICAGO, ILLINOIS, A CORPORATION OF ILLINOIS.

DRIVE-CHAIN.

958,675.  Specification of Letters Patent.  Patented May 17, 1910.

Application filed June 9, 1909. Serial No. 501,054.

*To all whom it may concern:*

Be it known that I, HAROLD S. PIERCE, a citizen of the United States, residing in Philadelphia, Pennsylvania, have invented certain Improvements in Drive-Chains, of which the following is a specification.

My invention relates to certain improvements in drive chains which are made of a series of enchained links, the plates of one link alternating with the plates of another link on the pintle, and each plate has teeth adapted to bear against the sides of the teeth of the sprocket wheel.

The object of my invention is to provide the teeth of the plates with extended bearing surfaces so as to prevent the rapid cutting or wearing away of the teeth of the plates and the surfaces of the teeth of the sprocket wheels. This object I attain in the following manner, reference being had to the accompanying drawing, in which:—

Figure 1, is a longitudinal sectional view of a portion of a chain illustrating my invention; Fig. 2, is a transverse sectional view on the line 2—2, Fig. 1; Fig. 3, is a perspective view of one of the plates made in accordance with my invention; Fig. 4, is a sectional view of one of the plates on the line 4—4, Fig. 1; Fig. 5, is a sectional view of one of the plates on the line 5—5, Fig. 1; and Figs. 6 and 7, are views illustrating modifications of my invention.

$A'$ and $A^2$ are the links of the chain. These links are each made of a series of plates $A$ and each plate has openings $a$ for the passage of the pivot pins $B$, and each plate has teeth $a'$ which bear against the sides of the teeth of the sprocket wheel.

In the chain illustrated in Figs. 1 and 2, the links $A'$ and $A^2$ are each composed of a series of plates placed side by side and so assembled that the plates of one series alternate with those of the other series. In chains of this type, as hitherto made, there are thus usually spaces between the teeth of each set of plates adjacent their bearing faces; the thickness of each of these spaces being equal to the thickness of a plate or plates of another set, so that the teeth of the plates do not have an extended bearing upon the teeth of a sprocket wheel.

By my invention however I extend the tooth bearings so that the bearing surface of the chain is practically equal to the bearing surface of the teeth of the sprocket wheel. This I do by forming laterally extended bearings $c$ on the end of each tooth and these bearings project preferably on each side of the tooth to about the middle of the space between the plates, so that when the plates are assembled, as shown in Fig. 2, the extended bearings form a continuous surface extending from one edge of the chain to the other. In this instance it will be noticed that I form extended bearings $d$ on the plates for the pivot pins $B$; the bearings extending laterally to about the middle of the space between the plates, and these bearings are adapted to enter cavities in the alternate plates, but I lay no claim to this particular feature.

In some instances the extended bearing surface of the teeth may be made of hard metal inserted in the face of the teeth as illustrated at $e'$, Fig. 6, and in other instances the bearing surface may be made of a single plate extending preferably the full width of the chain, as shown at $e^2$ in Fig. 7, in which case said plate can be secured to the teeth of the plates by welding, riveting or by any other suitable means. It will be seen that by providing the faces of the teeth of the plates with extended bearings I materially increase the life of the plates and at the same time prevent any tendency to cut the bearing faces of the sprocket wheel.

In the specification I have used the term plate to indicate the elements which are assembled to form the link of the width desired, and it will be understood that the term plate includes a single link or one of a series of plates forming a link in a chain of the type illustrated.

I claim:—

1. A chain link plate having teeth adapted to engage the teeth of a sprocket wheel, said teeth having laterally extended bearings.

2. A drive chain made up of a series of links each consisting of a series of plates, the plates of the links having laterally extended bearings for contact with the teeth of sprocket wheels.

3. A chain link plate having teeth adapted to bear against the teeth of a sprocket wheel, each tooth having an extended bearing surface projecting beyond both of its sides.

4. The combination in a drive chain, of a series of links, each link composed of a series of plates having teeth formed to engage the teeth of a sprocket wheel, the plates of one series alternating with those of another series, thus spacing the plates of one series apart, with lateral projections on each tooth, said projections at either end of each link being in line one with another and forming an extended bearing surface.

5. The combination in a chain, of a series of links, each consisting of a plurality of plates having teeth and laterally extended bearings on each tooth, the bearings of the teeth at either end of each link lying in substantially the same plane.

6. The combination in a chain, of a series of links, each consisting of a plurality of plates having teeth provided with laterally extended bearings, the bearings of the teeth at either end of each link lying in substantially the same plane and forming a continuous bearing surface extending across the link.

7. A link plate having an angular tooth at each end, with a laterally extended bearing at the outer face of each tooth.

8. A link plate having teeth, each provided with a laterally extended flat bearing, the planes of the said bearings lying at an angle to each other.

9. A link plate having teeth each provided with an extended bearing and formed to engage a sprocket wheel; with a metallic insert mounted on each bearing.

10. A chain link plate having a tooth adapted to engage the teeth of a sprocket wheel, said tooth having a laterally extended bearing.

11. A chain link plate having an angular tooth with a laterally extended bearing at the working face of the tooth.

12. A chain link plate having a tooth adapted to engage the teeth of a sprocket wheel, said tooth having an extended bearing projecting on both sides of the plate.

In testimony whereof, I have signed my name to this specification, in the presence of two subscribing witnesses.

HAROLD S. PIERCE.

Witnesses:
WM. E. SHUPE,
WM. A. BARR.